United States Patent
Arita et al.

(10) Patent No.: US 9,409,516 B2
(45) Date of Patent: Aug. 9, 2016

(54) VEHICLE APPROACH NOTIFICATION SOUND GENERATING APPARATUS

(75) Inventors: Hidekazu Arita, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/414,661

(22) PCT Filed: Sep. 5, 2012

(86) PCT No.: PCT/JP2012/072598
§ 371 (c)(1),
(2), (4) Date: Jan. 13, 2015

(87) PCT Pub. No.: WO2014/038010
PCT Pub. Date: Mar. 13, 2014

(65) Prior Publication Data
US 2015/0203031 A1 Jul. 23, 2015

(51) Int. Cl.
*B60Q 5/00* (2006.01)
*G01S 3/808* (2006.01)
*G10K 15/02* (2006.01)
*B60Q 1/50* (2006.01)

(52) U.S. Cl.
CPC ............ *B60Q 5/008* (2013.01); *G01S 3/8086* (2013.01); *G10K 15/02* (2013.01); *B60Q 1/506* (2013.01); *B60Q 5/00* (2013.01)

(58) Field of Classification Search
None
See application file for complete search history.

(56) References Cited

U.S. PATENT DOCUMENTS 8,169,305 B2 5/2012 Matsumoto et al.
(Continued)

FOREIGN PATENT DOCUMENTS

CN 201633621 U 11/2010
JP 2005-219715 A 8/2005
(Continued)

*Primary Examiner* — Benjamin C Lee
*Assistant Examiner* — Rajsheed Black-Childress
(74) *Attorney, Agent, or Firm* — Birch, Stewart, Kolasch & Birch, LLP (57) ABSTRACT

An object of the present invention is to provide a vehicle approach notification sound generating apparatus that communicates with another vehicle so as to be capable of generating a vehicle approach notification sound different from another vehicle. The vehicle approach notification sound generating apparatus of the present invention includes a vehicle approach notification sound acquiring unit that acquires the vehicle approach notification sound output from another vehicle, a similarity distance calculating unit that calculates a similarity distance between the vehicle approach notification sound of the own vehicle output from a vehicle approach notifying unit and the vehicle approach notification sound of another vehicle acquired by the vehicle approach notification sound acquiring unit, a communication unit that is communicable with another vehicle, and a controller that communicates with another vehicle via the communication unit, makes adjustment whether the vehicle approach notification sound of another vehicle or the own vehicle is to be changed, and when the vehicle approach notification sound of the own vehicle is to be changed, makes control to change the vehicle approach notification sound of the own vehicle so that the similarity distance calculated by the similarity distance calculating unit is a predetermined threshold or more.

7 Claims, 4 Drawing Sheets

(56) References Cited

U.S. PATENT DOCUMENTS

| | | |
|---|---|---|
| 8,712,615 B2 | 4/2014 | Omote et al. |
| 2005/0175186 A1 | 8/2005 | Yasushi et al. |
| 2009/0066499 A1* | 3/2009 | Bai ................. G10K 15/04 340/459 |
| 2010/0214085 A1* | 8/2010 | Avery ............... G08G 1/161 340/435 |
| 2011/0199199 A1* | 8/2011 | Perkins ............. B60Q 1/506 340/435 |
| 2012/0166042 A1* | 6/2012 | Kokido ............. B60Q 5/008 701/36 |

FOREIGN PATENT DOCUMENTS

| | | |
|---|---|---|
| JP | 2006-264525 A | 10/2006 |
| JP | 2011-88541 A | 5/2011 |
| JP | 2011-178342 A | 9/2011 |
| JP | 2011-207390 A | 10/2011 |
| JP | 2011-246121 A | 12/2011 |
| WO | WO 2012/066672 A1 | 5/2012 |

* cited by examiner

VEHICLE APPROACH NOTIFICATION SOUND GENERATING APPARATUS

TECHNICAL FIELD

The present invention relates to a vehicle approach notification sound generating apparatus that generates a vehicle approach notification sound for notifying pedestrians of approach of a own vehicle.

BACKGROUND ART

Conventionally, electric vehicles and hybrid vehicles are provided with a vehicle approach notification sound generating apparatus that generates a pseudo sound (vehicle approach notification sound) in order to make pedestrians recognize approach of an own vehicle, and an example of the apparatus is an apparatus that controls sound quality and a pattern of a vehicle approach notification sound according to a predetermined condition (for example, see Patent Document 1).

In Patent Document 1, sound pressure and sound quality of a pseudo sound are changed based on information acquired from the outside. Further, for example, a pseudo sound of another vehicle that approaches and goes forward is set to be different from a pseudo sound of the own vehicle so that ambient pedestrians is made to easily recognize the presence of the own vehicle.

Further, a technique that changes a pattern of a pseudo sound of an own vehicle so that the pattern is different from a pseudo sound of another vehicle and an ambient sound (for example, see Patent Documents 2 to 5).

PRIOR ART DOCUMENTS

Patent Documents

Patent Document 1: Japanese Patent Application Laid-Open No. 2011-246121
Patent Document 2: Japanese Patent Application Laid-Open No. 2011-207390
Patent Document 3: Japanese Patent Application Laid-Open No. 2011-088541
Patent Document 4: Japanese Patent Application Laid-Open No. 2006-264525
Patent Document 5: Japanese Patent Application Laid-Open No. 2005-219715

SUMMARY OF INVENTION

Problems to be Solved by the Invention

However, in Patent Documents 1 to 5, an own vehicle does not communicate with another vehicle and pseudo sounds are not adjusted. Therefore, for example, as a result of adjusting pseudo sounds of the own vehicle and another vehicle independently, the pseudo sound of the own vehicle and the pseudo sound of another sound are equal to each other, and a pedestrian is likely to be incapable of discriminating the own vehicle from another vehicle.

The present invention is devised in order to solve these problems, and its object is to provide a vehicle approach notification sound generating apparatus that is capable of communicating with another vehicle and generating a vehicle approach notification sound different from another vehicle.

Means for Solving the Problems

In order to solve the above problems, a vehicle approach notification sound generating apparatus of the present invention includes a vehicle approach notifying unit that outputs a vehicle approach notification sound for notifying of approach of an own vehicle, a vehicle approach notification sound acquiring unit that acquires a vehicle approach notification sound output from another vehicle, a similarity distance calculating unit that calculates a similarity distance between the vehicle approach notification sound of the own vehicle output from the vehicle approach notifying unit and the vehicle approach notification sound of another vehicle acquired by the vehicle approach notification sound acquiring unit, a communication unit that is communicable with another vehicle, and a controller that communicates with another vehicle via the communication unit, makes adjustment whether the vehicle approach notification sound of another vehicle or the own vehicle is to be changed, and when the vehicle approach notification sound of the own vehicle is to be changed, makes control to change the vehicle approach notification sound of the own vehicle so that the similarity distance calculated by the similarity distance calculating unit is a predetermined threshold or more.

Effect of the Invention

According to the present invention, the vehicle approach notifying unit that outputs a vehicle approach notification sound for notifying of approach of an own vehicle, the vehicle approach notification sound acquiring unit that acquires the vehicle approach notification sound output from another vehicle, the similarity distance calculating unit that calculates a similarity distance between the vehicle approach notification sound of the own vehicle output from the vehicle approach notifying unit and the vehicle approach notification sound of another vehicle acquired by the vehicle approach notification sound acquiring unit, the communication unit that is communicable with another vehicle, and the controller that communicates with another vehicle via the communication unit, and makes adjustment whether the vehicle approach notification sound of another vehicle or the own vehicle is to be changed, and when the vehicle approach notification sound of the own vehicle is to be changed, makes control to change the vehicle approach notification sound of the own vehicle so that the similarity distance calculated by the similarity distance calculating unit is a predetermined threshold or more are provided. For this reason, the communication with another vehicle enables a vehicle approach notification sound different from another vehicle to be generated.

The purpose, features, aspects, and advantages of the present invention will become more apparent from the detailed description and the accompanying drawings below.

DESCRIPTION OF EMBODIMENT

An embodiment of the present invention is described below with reference to the drawings.

Embodiment

A constitution of a vehicle approach notification sound generating apparatus according to the embodiment of the present invention is described. In the embodiment, a vehicle approach notification sound includes not only a pseudo sound of an engine sound of a conventional gasoline vehicle but also all sounds that can be used for notifying of approach of vehicles such as a warning sound (artificial sound) at time when a train approaches on a platform and music. Further, the vehicle approach notification sound generating apparatus according to the embodiment is assumed to be mounted to vehicles such as electric vehicles or hybrid vehicles whose traveling sound is low.

Figure 1:
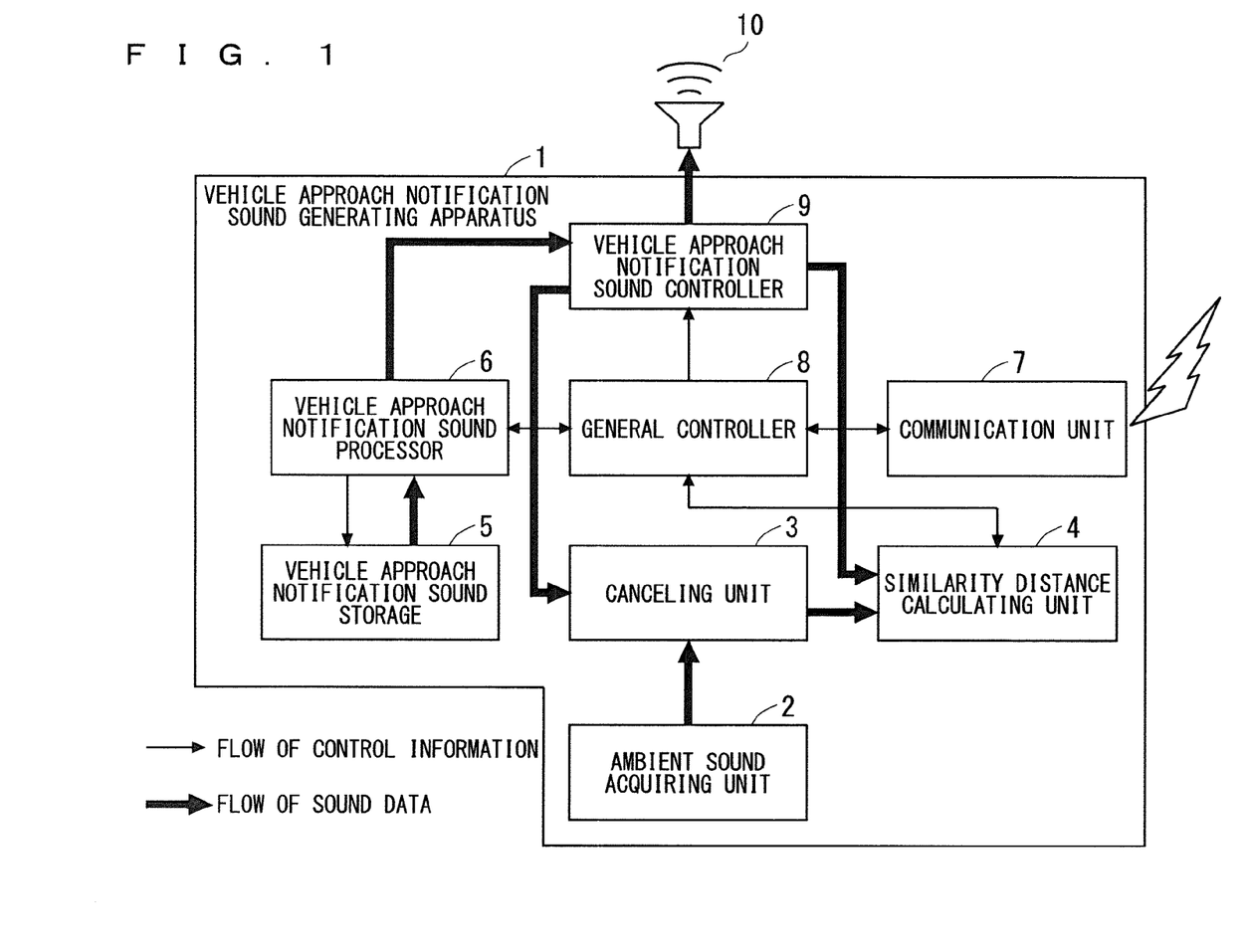
FIG. 1 is a block diagram illustrating one example of a constitution of a vehicle approach notification sound generating apparatus according to an embodiment of the present invention.

FIG. 1 is a block diagram illustrating one example of the constitution of the vehicle approach notification sound generating apparatus 1 according to the embodiment.

As shown in FIG. 1, the vehicle approach notification sound generating apparatus 1 includes an ambient sound acquiring unit 2, a canceling unit 3, a similarity distance calculating unit 4, a vehicle approach notification sound storage 5, a vehicle approach notification sound processor 6, a communication unit 7, a general controller 8, and a vehicle approach notification sound controller 9. Further, the vehicle approach notification sound controller 9 is connected to a vehicle exterior speaker 10. Further, in FIG. 1, a thin line arrow represents a flow of control information, and a thick line arrow represents a flow of sound data.

The ambient sound acquiring unit 2 (vehicle approach notification sound acquiring unit) acquires sounds (ambient sounds) around an own vehicle including a vehicle approach notification sound output from another vehicle from the outside. The ambient sounds acquired from the ambient sound acquiring unit 2 are input into the canceling unit 3. An example of the ambient sound acquiring unit 2 is a microphone.

The canceling unit 3 cancels a vehicle approach notification sound of the own vehicle output from the vehicle exterior speaker 10 in the ambient sounds acquired by the ambient sound acquiring unit 2. The ambient sounds from which the vehicle approach notification sound of the own vehicle is canceled by the canceling unit 3 are input into the similarity distance calculating unit 4.

The similarity distance calculating unit 4 calculates a similarity distance between the vehicle approach notification sound of the own vehicle output from the vehicle exterior speaker 10 and the vehicle approach notification sound of another vehicle included in the ambient sounds input from the canceling unit 3. The similarity distance is calculated in such a manner that frequency analysis such as fast Fourier transform (FFT) of waveforms of two sounds is performed so that frequency spectra are obtained and the spectra are normalized and overlapped and an area of a difference portion is obtained as the similarity distance (Spectrum Distance) between two sounds. Various indexes represent the difference between the two sounds such as an index based on a frequency characteristic and an index to which a time change element is added are proposed, and a method for obtaining the similarity distance is not limited to the above one.

The vehicle approach notification sound storage 5 stores at least one or more kinds of vehicle approach notification sounds. Further, the vehicle approach notification sound storage 5 stores a base notification sound and a plurality of additional notification sounds, described later.

The vehicle approach notification sound processor 6 processes (generates) the vehicle approach notification sounds stored in the vehicle approach notification sound storage 5 so as to output them to the vehicle approach notification sound controller 9.

The communication unit 7 can communicate with another vehicle. The communication unit 7 has a vehicle-vehicle communication function that is realized by, for example, wireless communication such as Ultra Wide Band (UWB) and WiFi or optical communication.

The general controller 8 (controller) communicates with another vehicle via the communication unit 7, and adjusts whether the vehicle approach notification sound of another vehicle or the own vehicle is to be changed. When the vehicle approach notification sound of the own vehicle is to be changed, the vehicle approach notification sound processor 6 is controlled to change the vehicle approach notification sound of the own vehicle so that the similarity distance to be calculated by the similarity distance calculating unit 4 is a predetermined threshold or more, and the vehicle approach notification sound controller 9 is controlled to output (generate) the changed vehicle approach notification sound.

The vehicle approach notification sound controller 9 generates a vehicle approach notification sound signal based on the control (instruction) of the general controller 8, and outputs the generated vehicle approach notification sound signal to the vehicle exterior speaker 10.

The vehicle exterior speaker 10 (vehicle approach notifying unit) outputs the vehicle approach notification sound signal from the vehicle approach notification sound controller 9 as a vehicle approach notification sound to the outside of the vehicle.

An operation of the vehicle approach notification sound generating apparatus 1 according to the embodiment is described below.

Figure 2:
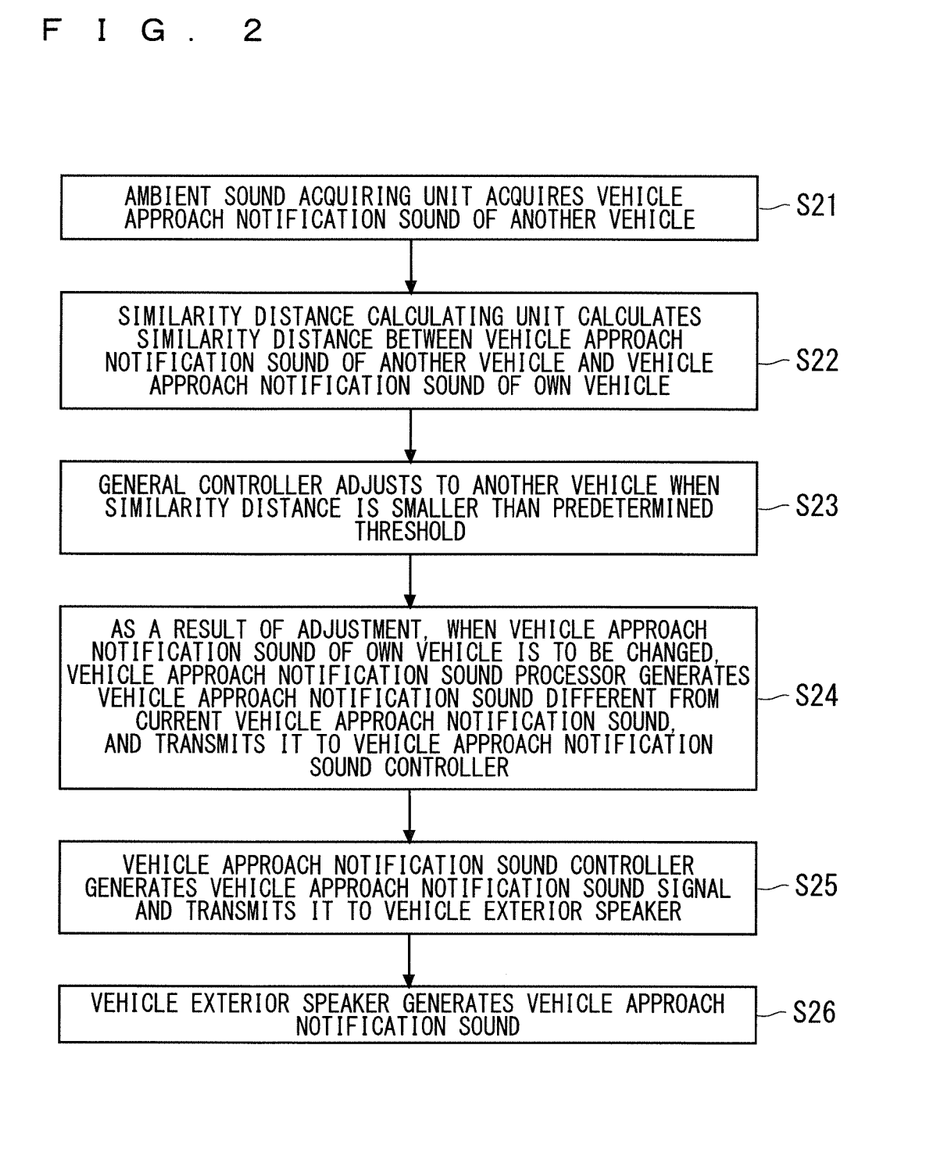
FIG. 2 is a flowchart illustrating one example of an operation of the vehicle approach notification sound generating apparatus according to the embodiment of the present invention.

FIG. 2 is a flowchart illustrating one example of the operation of the vehicle approach notification sound generating apparatus 1.

The ambient sound acquiring unit 2 acquires ambient sounds including the vehicle approach notification sound of another vehicle and the vehicle approach notification sound notified by the own vehicle at step S21. The acquired ambient sounds are input into the canceling unit 3. On the other hand, an original sound of the vehicle approach notification sound of the own vehicle before output from the speaker is input into the canceling unit 3 from the vehicle approach notification sound controller 9. The canceling unit 3 cancels the vehicle approach notification sound of the own vehicle included in the ambient sounds through a so-called echo canceling sound signal process. When the canceling unit 3 cancels the vehicle approach notification sound of the own vehicle in such a manner, the vehicle approach notification sound of another vehicle can be extracted.

The similarity distance calculating unit 4 calculates the similarity distance between the vehicle approach notification sound of another vehicle included in the ambient sounds input from the canceling unit 3 and the vehicle approach notification sound of the own vehicle input from the vehicle approach notification sound controller 9 at step S22. The method for calculating the similarity distance is as described above.

When the similarity distance between the vehicle approach notification sound of another vehicle and the vehicle approach notification sound of the own vehicle calculated by the similarity distance calculating unit 4 is smaller than a predetermined threshold (the vehicle approach notification sound of another vehicle and the vehicle approach notification sound of the own vehicle are similar to each other (see a portion (a) of FIG. 3, described later), the general controller 8 communicates with another vehicle via the communication unit 7, and makes adjustment whether the vehicle approach notification sound of another vehicle or own vehicle is to be changed at step S23. When the similarity distance calculated by the similarity distance calculating unit 4 is the predetermined threshold or less, the general controller 8 can automatically adjust the vehicle approach notification sound with respect to another vehicle because the communication with another vehicle is established, and thus difficulty is reduced.

Examples of the above adjusting method include a method for preferentially changing a vehicle approach notification sound of a vehicle which communicates with the other one in advance (which makes inquiries about adjustment), and a method for changing the vehicle approach notification sound of a vehicle which informs the other vehicle of changing of a vehicle approach notification sound.

Further, a method in which a vehicle approach notification sound of a vehicle which is communicated by the other vehicle (which receives inquires about adjustment) is preferentially changed is also present.

Further, another example of the adjusting method is a method for changing the vehicle approach notification sound of an own vehicle when the own vehicle cannot communicate with another vehicle. The case where the communication with another vehicle is disabled is a case where another vehicle does not have a function that adjusts a vehicle approach notification sound, such as a case where another vehicle does not have communication means, a case where another vehicle has communication means but does not have the vehicle approach notification sound generating apparatus, and a case where another vehicle is a gasoline vehicle having communication means. Even when another vehicle does not have the function that adjusts a vehicle approach notification sound, the own vehicle can automatically adjust a vehicle approach notification sound.

A relationship between the similarity distance and the threshold is described with reference to FIG. 3.

Figure 3:
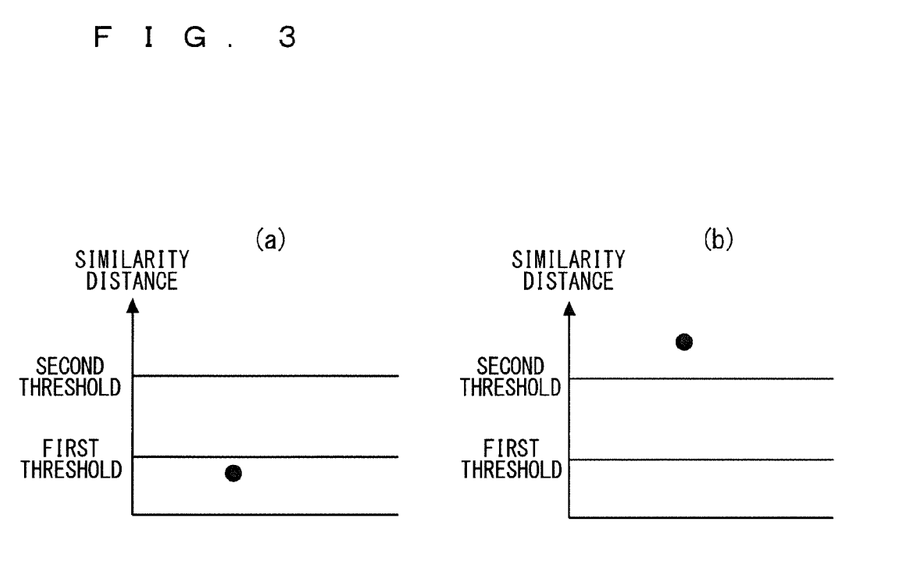
FIG. 3 is a diagram describing a relationship between a similarity distance and a threshold according to the embodiment of the present invention.

As shown in FIG. 3, in this embodiment, a first threshold, and a second threshold that is larger than the first threshold are provided for the similarity distance. Further, a circle mark in FIG. 3 represents the similarity distance between the vehicle approach notification sound of another vehicle and the vehicle approach notification sound of the own vehicle calculated by the similarity distance calculating unit 4.

The portion (a) of FIG. 3 shows a case where the similarity distance is the first threshold or less. In this case, the vehicle approach notification sound of another vehicle is similar to the vehicle approach notification sound of the own vehicle.

A portion (b) of FIG. 3 shows a case where the similarity distance is the second threshold or more. In this case, the vehicle approach notification sound of another vehicle is sufficiently different from (dissimilar to) the vehicle approach notification sound of the own vehicle.

With return to FIG. 2, as a result of adjustment with respect to another vehicle, when the vehicle approach notification sound of the own vehicle is going to be changed, the general controller 8 controls the vehicle approach notification sound processor 6 so that the vehicle approach notification sound different from a current vehicle approach notification sound is generated at step S24. That is to say, the general controller 8 controls the vehicle approach notification sound processor 6 so that the similarity distance that is the first threshold or less (the portion (a) of FIG. 3) becomes the second threshold or more (the portion (b) of FIG. 3) and the vehicle approach notification sound of the own vehicle is generated (changed). When the vehicle approach notification sound is generated based on the similarity distance in such a manner, details of the vehicle approach notification sound of the own vehicle can be set according to the vehicle approach notification sound of another vehicle.

The process in the vehicle approach notification sound processor 6 is described below.

Figure 4:
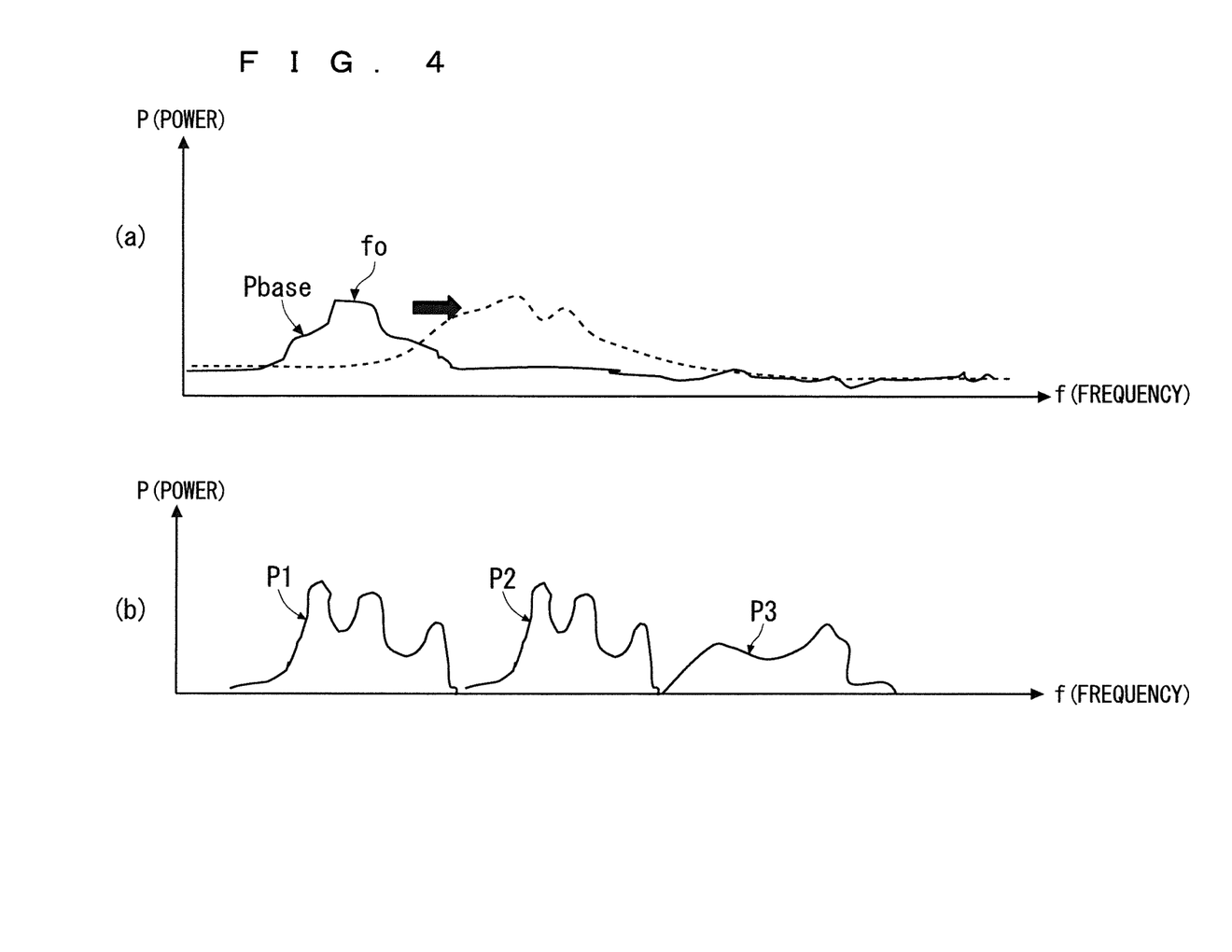
FIG. 4 is a diagram illustrating one example of a base notification sound and an additional notification sound according to the embodiment of the present invention.

The vehicle approach notification sound storage 5 stores a base notification sound (P base) and a plurality of additional notification sounds (P1,P2,P3) as shown in FIG. 4. In FIG. 4, P (power) on an ordinate axis represents an output of the vehicle approach notification sound (strength of the vehicle approach notification sound), and an abscissa axis represents a frequency f.

As shown in a portion (a) of FIG. 4, the base notification sound (P base) is a sound specific to each type of a vehicle (car model), and a peak frequency fo of the base notification sound (P base) changes according to a motor rotation number of the vehicle or a traveling speed of the vehicle. For example, as the traveling speed of the vehicle is faster (the motor rotation number is faster), the peak frequency fo of the base notification sound (P base) is changed to a high-frequency side. Further, the frequency characteristic is fixed, and as the traveling speed of the vehicle is faster, the pitch frequency may be set to be higher.

Further, as shown in a portion (b) of FIG. 4, the additional notification sounds P1, P2, and P3 have different frequencies.

The vehicle approach notification sound processor 6 processes (generates) the vehicle approach notification sound different from the current vehicle approach notification sound based on the base notification sound (P base) and the plurality of additional notification sounds (P1, P2, P3) shown in FIG. 4 stored in the vehicle approach notification sound storage 5. Concretely, Pbase, Pbase+P1, Pbase+P2, and Pbase+P3 are present as the vehicle approach notification sounds processed by the vehicle approach notification sound processor 6. A sign "+" means that sounds are synthesized (superimposed) sonically. The vehicle approach notification sound processed by the vehicle approach notification sound processor 6 always includes the base notification sound (P base). Further, when a similarity distance between the processed vehicle approach notification sound and the vehicle approach notification sound of another vehicle is the second threshold or more (see the portion (b) of FIG. 3), any one of Pbase, Pbase+P1, Pbase+P2, and Pbase+P3 may be used as the vehicle approach notification sound.

As a result, since the vehicle approach notification sound processor 6 synthesizes the base notification sound (P base) with the additional notification sounds (P1, P2, P3) so as to process (generate) the vehicle approach notification sound, pedestrians can be made to recognize the own vehicle and another vehicle distinctively and can be made to recognize a car model through the base notification sound.

With return to FIG. 2, at step S25, the vehicle approach notification sound controller 9 generates a vehicle approach notification sound signal based on the vehicle approach notification sound processed by the vehicle approach notification sound processor 6, and transmits the generated vehicle approach notification sound signal to the vehicle exterior speaker 10.

The vehicle exterior speaker 10 receives the vehicle approach notification sound signal from the vehicle approach notification sound controller 9, and generates (outputs) a vehicle approach notification sound based on the received vehicle approach notification sound signal at step S26.

The base notification sound and the additional notification sounds that are exemplified above are not limited to the above sounds, and another suitable sounds may be used. For example, the additional notification sounds are not continuous sounds but may be intermittent sounds. Further, the additional notification sounds also may change in cooperation with a speed.

Further, in this embodiment, in FIG. 3, the first threshold is different from the second threshold but may be the same as each other. Further, input means with which a driver can change settings of the first threshold and the second threshold may be provided.

According to this embodiment, when the vehicle approach notification sound of the own vehicle is similar to the vehicle approach notification sound of another vehicle, adjustment is made whether the vehicle approach notification sound of the own vehicle or another vehicle is to be changed through the communication with another vehicle. For this reason, the own vehicle can generate a vehicle approach notification sound different from another vehicle, and pedestrians have a high likelihood of recognizing the own vehicle and another vehicle distinctively.

Modified Example 1

This embodiment described that when the vehicle approach notification sound of the own vehicle is to be changed, the vehicle approach notification sound processor 6 synthesizes the base notification sound and the additional notification sounds stored in the vehicle approach notification sound storage 5 so as to process the vehicle approach notification sound at step S24 in FIG. 2, but the present invention is not limited to this.

For example, at least one or more kinds of the vehicle approach notification sounds are stored in the vehicle approach notification sound storage 5 in advance, and when the vehicle approach notification sound of the own vehicle is changed, the vehicle approach notification sound stored in the vehicle approach notification sound storage 5 in advance may be changed.

As a concrete operation, the general controller 8 selects the vehicle approach notification sound such that the similarity distance with respect to the vehicle approach notification sound of another vehicle is a predetermined threshold or more (for example, the second threshold or more shown in the portion (b) of FIG. 3) from the vehicle approach notification sounds stored in the vehicle approach notification sound storage 5. The selected vehicle approach notification sound is output from the vehicle exterior speaker 10 through the process similar to the above embodiment (step S25 and step S26 in FIG. 2).

Further, when the similarity distance with respect to the vehicle approach notification sound of another vehicle is not yet the predetermined value or more even after the vehicle approach notification sound stored in the vehicle approach notification sound storage 5 in advance is changed, similarly to step S24 to step S26 in FIG. 2, the vehicle approach notification sound processor 6 may process (generate) the vehicle approach notification sound so as to output it from the vehicle exterior speaker 10.

As a result, since the vehicle approach notification sound processor 6 processes the vehicle approach notification sound when the similarity distance between the vehicle approach notification sound stored in the vehicle approach notification sound storage 5 and the vehicle approach notification sound of another vehicle is the predetermined threshold or less, even when the vehicle approach notification sound stored in the vehicle approach notification sound storage 5 in advance, which has been changed, is still similar to the vehicle approach notification sound of another vehicle, a new suitable vehicle approach notification sound can be processed. For this reason, a vehicle approach notification sound different from another vehicle can be generated.

Modified Example 2

This embodiment described the case where the vehicle approach notification sound of the own vehicle is to be changed at step S24 in FIG. 2, but the vehicle approach notification sound of another vehicle may be changed.

Further, for example, in the case where the vehicle approach notification sound of another vehicle is changed, the own vehicle ambient sound acquiring unit 2 (vehicle approach notification sound acquiring unit) again acquires the vehicle approach notification sound of another vehicle after predetermined time passes. When the vehicle approach notification sound of another vehicle that is again acquired by the ambient sound acquiring unit 2 is not changed from the vehicle approach notification sound of another vehicle acquired at the previous time, the general controller 8 may change the vehicle approach notification sound of the own vehicle.

Further, when the notification sound is changed and the similarity distance is smaller than the first threshold, the vehicle approach notification sound of the own vehicle may be changed.

As a concrete operation, when predetermined time passes after the communication with another vehicle is established and adjustment is made so that the vehicle approach notification sound of another vehicle is to be changed, the ambient sound acquiring unit 2 again acquires the vehicle approach notification sound of another vehicle. The general controller 8 determines whether the vehicle approach notification sound of another vehicle that is again acquired is to be changed from the vehicle approach notification sound of another vehicle that is acquired at the previous time, and when not changed, it changes the vehicle approach notification sound of the own vehicle. The vehicle approach notification sound of the own vehicle may be changed by the above changing method.

Examples of the case where the vehicle approach notification sound of another vehicle that is again acquired is not changed from the vehicle approach notification sound of another vehicle that is acquired at the previous time include a case where the vehicle approach notification sound of another vehicle is not changed although the own vehicle requests another vehicle to change the vehicle approach notification sound at the time of the adjustment with respect to another vehicle, and a case where although the own vehicle requests another vehicle to change the vehicle approach notification sound at the time of the adjustment with respect to another vehicle, another vehicle is not provided with communication means and thus makes no response.

As a result, when the vehicle approach notification sound of another vehicle that is again acquired by the ambient sound acquiring unit 2 is not changed from the vehicle approach notification sound of another vehicle that is acquired in the previous time, the general controller 8 changes the vehicle approach notification sound of the own vehicle. For this reason, when the similarity distance between the vehicle approach notification sound of another vehicle and the vehicle approach notification sound of the own vehicle is smaller than the predetermined threshold, the vehicle approach notification sounds of another vehicle and the own vehicle are not continued to be changed.

In this embodiment, the vehicle exterior speaker 10 may be a general acoustic speaker, and a directional speaker represented by a parametric speaker may be used.

Further, in this embodiment, the additional notification sounds to be stored in the vehicle approach notification sound storage 5 are P1, P2, and P3, but the sounds are not limited to them, and at least one or more additional notification sounds may be stored in the vehicle approach notification sound storage 5.

Further, at step S25 in FIG. 2, when the vehicle approach notification sound controller 9 generates a vehicle approach notification sound signal, the strength (level) of the vehicle approach notification sound may be fixed (constant), or may be changed arbitrarily.

Further, in the modified example 1, when the similarity distance with respect to the vehicle approach notification sound of another vehicle is not yet a predetermined threshold or more even though the vehicle approach notification sound stored in the vehicle approach notification sound storage 5 in advance is changed, the vehicle approach notification sound processor 6 may process the vehicle approach notification sound using the vehicle approach notification sound that is stored in the vehicle approach notification sound storage 5 in advance.

In the present invention, the embodiment may be suitably modified and omitted within the scope of the present invention.

The present invention is described in detail, but the above description is illustrative in all aspects, and the present invention is not limited to this. An infinite number of unillustrated modified examples can be assumed without deviation from the scope of the present invention.

EXPLANATION OF LETTERS OR NUMERALS

1: vehicle approach notification sound generating apparatus, 2: ambient sound acquiring unit, 3: canceling unit, 4: similarity distance calculating unit, 5: vehicle approach notification sound storage, 6: vehicle approach notification sound processor, 7: communication unit, 8: general controller, 9: vehicle approach notification sound controller, 10: vehicle exterior speaker.

The invention claimed is:

1. A vehicle approach notification sound generating apparatus comprising:
   a vehicle approach notifying unit that outputs a vehicle approach notification sound for notifying pedestrians of approach of an own vehicle;
   a vehicle approach notification sound acquiring unit that acquires a vehicle approach notification sound output from another vehicle;
   a similarity distance calculating unit that calculates a similarity distance which is a metric of similarity between said vehicle approach notification sound of the own vehicle output from said vehicle approach notifying unit and said vehicle approach notification sound of said another vehicle acquired by said vehicle approach notification sound acquiring unit;
   a communication unit configured for communicating with said another vehicle to determine which of said vehicle approach notification sound of said another vehicle and said own vehicle is to be changed; and
   a controller that, when said similarity distance is a predetermined threshold or less, attempts to communicate with said another vehicle via said communication unit and, based on the attempted communication, determines whether said vehicle approach notification sound of said another vehicle or said own vehicle is to be changed, and when said vehicle approach notification sound of said own vehicle is to be changed, makes control to change said vehicle approach notification sound of said own vehicle so that said similarity distance calculated by said similarity distance calculating unit is more than the predetermined threshold.

2. The vehicle approach notification sound generating apparatus according to claim 1, wherein when said controller is not capable of communicating with said another vehicle, said controller changes said vehicle approach notification sound of said own vehicle.

3. The vehicle approach notification sound generating apparatus according to claim 1, wherein said similarity distance includes a first threshold and a second threshold that is larger than the first threshold,
   when said similarity distance is said first threshold or less, said controller changes said vehicle approach notification sound so that similarity distance is said second threshold or more.

4. The vehicle approach notification sound generating apparatus according to claim 1 further comprising:
   a vehicle approach notification sound storage that stores one or more kinds of vehicle approach notification sounds; and
   a vehicle approach notification sound processor that processes a given one of the one or more kinds of vehicle approach sounds stored in said vehicle approach notification sound storage to obtain said vehicle approach notification sound of the own vehicle, wherein
   when said similarity distance between said vehicle approach notification sound obtained by processing the given one of the one or more kinds of vehicle approach sounds stored in said vehicle approach notification sound storage and said vehicle approach notification sound of said another vehicle is not the predetermined threshold or more, said vehicle approach notification sound processor generates said vehicle approach notification sound of the own vehicle by changing the vehicle approach notification sound obtained by processing the given one of the one or more kinds of vehicle approach sounds stored in said vehicle approach notification sound storage.

5. The vehicle approach notification sound generating apparatus according to claim 4, wherein said vehicle approach notification sound storage stores a base notification sound and a plurality of additional notification sounds,
   said vehicle approach notification sound processor synthesizes said base notification sound with said additional notification sounds and processes said vehicle approach notification sound.

6. The vehicle approach notification sound generating apparatus according to claim 1 further comprising: a canceling unit that cancels said vehicle approach notification sound of said own vehicle output from said vehicle approach notifying unit.

7. The vehicle approach notification sound generating apparatus according to claim 1, wherein when said similarity distance calculated by said similarity distance calculating unit is the predetermined threshold or less, and said vehicle approach notification sound of said another vehicle is changed in said adjustment,
   said vehicle approach notification sound acquiring unit again acquires said vehicle approach notification sound of said another vehicle after predetermined time passes,
   when said vehicle approach notification sound of said another vehicle that is again acquired by said vehicle approach notification sound acquiring unit is not changed from said vehicle approach notification sound of said another vehicle that is acquired in the previous time, said controller changes said vehicle approach notification sound of said own vehicle.

* * * * *